(12) United States Patent
Lozano

(10) Patent No.: US 11,034,462 B2
(45) Date of Patent: Jun. 15, 2021

(54) DETECTION SYSTEM AND METHOD FOR MAKING CONTACT BETWEEN THE TIP OF A FLYING BOOM AND THE MOUTH OF A RECEPTACLE FOR AERIAL REFUELLING OPERATIONS WITH A BOOM

(71) Applicant: Defensya Ingenieria Internacional, S.L., Madrid (ES)

(72) Inventor: Alberto Adarve Lozano, Madrid (ES)

(73) Assignee: DEFENSYA INGENIERÍA INTERNACIONAL, S.L., Madrid (ES)

( * ) Notice: Subject to any disclaimer, the term of this patent is extended or adjusted under 35 U.S.C. 154(b) by 419 days.

(21) Appl. No.: 16/094,806

(22) PCT Filed: Apr. 11, 2017

(86) PCT No.: PCT/ES2017/070227
§ 371 (c)(1),
(2) Date: Oct. 18, 2018

(87) PCT Pub. No.: WO2017/182686
PCT Pub. Date: Oct. 26, 2017

(65) Prior Publication Data
US 2019/0118963 A1    Apr. 25, 2019

(30) Foreign Application Priority Data

Apr. 18, 2016 (ES) ................................ ES201630480

(51) Int. Cl.
*B64D 39/06* (2006.01)
*G01S 17/88* (2006.01)
(Continued)

(52) U.S. Cl.
CPC ............. *B64D 39/06* (2013.01); *B64D 39/00* (2013.01); *G01S 17/88* (2013.01); *G06T 7/20* (2013.01)

(58) Field of Classification Search
CPC ......... B64D 39/06; B64D 39/00; G01S 17/88; G06T 7/20
See application file for complete search history.

(56) References Cited

U.S. PATENT DOCUMENTS

| 3,475,001 A * | 10/1969 | Hieber ................... B64D 39/06 251/149.8 |
| 5,530,650 A | 6/1996 | Biferno et al. |

(Continued)

FOREIGN PATENT DOCUMENTS

WO          0102875          1/2001

*Primary Examiner* — Justin M Benedik
(74) *Attorney, Agent, or Firm* — William H. Honaker; Dickinson Wright PLLC

(57) ABSTRACT

System for detecting the tip of the pole of the flying boom of a tanker and of the mouth of the receptacle of the receiver for semi-automatic or automatic contact for in-flight refueling with a boom, which ensures to provide the control system of the tanker's boom with robust, reliable and simultaneous information in real time with regards to the end of its pole and of the mouth of the receiver's receptacle, at all times. To this end, the system comprises: 1) light emitters mounted on the tip of its pole, 2) light emitters mounted on the contour of the receptacle of the receiving aircraft, 3) a processing subsystem and 4) two 3D cameras, a TOF camera, synchronised with a light emitter and an additional camera together with a structured light emitter generated with a DOE-type lens.

12 Claims, 2 Drawing Sheets

(51) Int. Cl.
    *G06T 7/20*           (2017.01)
    *B64D 39/00*        (2006.01)

(56) References Cited

U.S. PATENT DOCUMENTS

| | | | |
|---|---|---|---|
| 5,904,729 A | 5/1999 | Ruzicka | |
| 6,966,525 B1* | 11/2005 | Schroeder | B64D 39/00 |
| | | | 244/135 A |
| 7,036,770 B2* | 5/2006 | Shelly | B64D 39/04 |
| | | | 244/135 A |
| 2003/0205643 A1* | 11/2003 | von Thal | B64D 39/00 |
| | | | 244/135 A |
| 2003/0209633 A1* | 11/2003 | Thal | B64D 39/00 |
| | | | 244/135 A |
| 2012/0261516 A1 | 10/2012 | Gilliland et al. | |
| 2013/0168497 A1* | 7/2013 | Rix | B64D 39/06 |
| | | | 244/135 A |
| 2016/0023775 A1* | 1/2016 | Hatcher | B64D 39/00 |
| | | | 244/135 A |

* cited by examiner

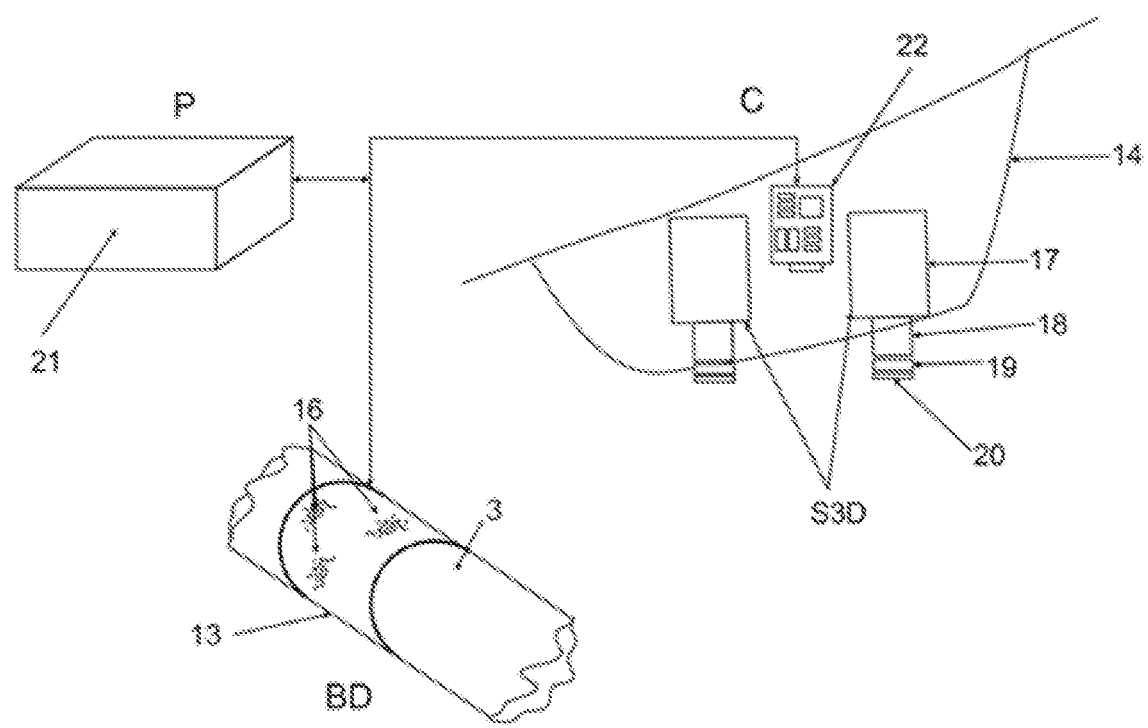
FIG. 1-A
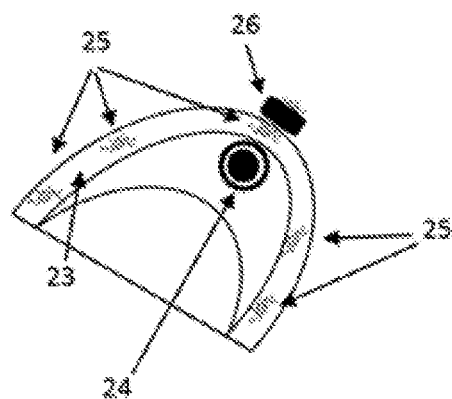
FIG. 1-B

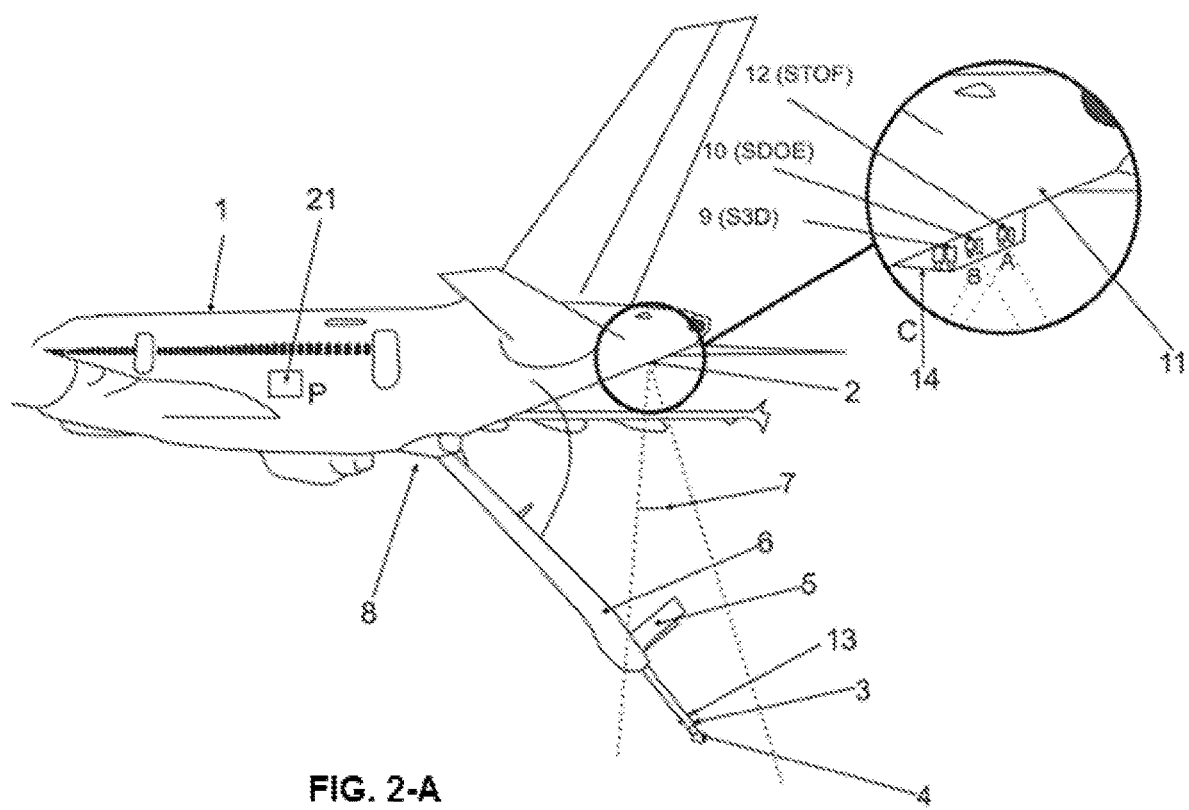
FIG. 2-A
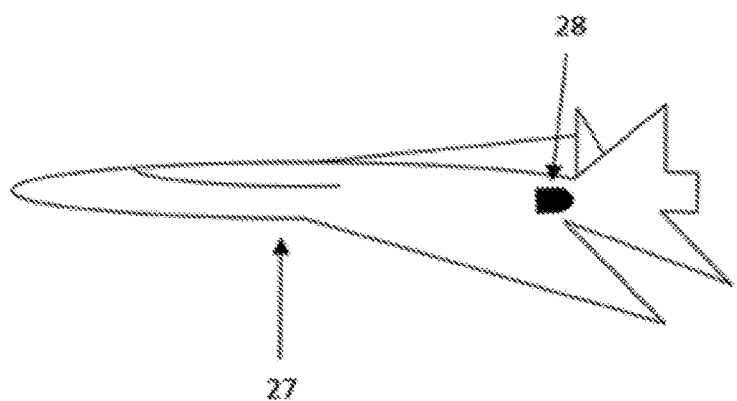
FIG. 2-B

DETECTION SYSTEM AND METHOD FOR MAKING CONTACT BETWEEN THE TIP OF A FLYING BOOM AND THE MOUTH OF A RECEPTACLE FOR AERIAL REFUELLING OPERATIONS WITH A BOOM

CROSS-REFERENCE TO RELATED APPLICATION

The present invention claims the benefit of PCT International Patent Application Serial No. PCT/ES2017/070227 filed Apr. 11, 2017, which claims priority to Spanish Patent Application Serial No. P201630480 filed Apr. 18, 2016, the entire disclosure of which are considered as part of the disclosure of this application and hereby incorporated by reference.

OBJECT OF THE INVENTION

Air refueling operations can essentially be classified into two main types: 1. Those with hoses and baskets and 2. Those with flying booms.

A boom is defined as the part of the refueling device, consisting of a ball and socket joint attached to the aircraft, from which hangs a hollow, elongated and rigid casing and from which a pole or internal part, also rigid, can be removed or retracted, at the end of which is the nozzle. This nozzle is where the fuel is finally dispensed, after connecting to the intake receptacle, which is in the receiving aircraft, after opening the hatch that shuts off the passage of fuel.

Refuelling operations with flying booms or simply booms require the end of the pole, which is in its interior and that dispenses the fuel (called dispensing nozzle) to be placed in a receptacle found on the upper surface of the receiving aircraft, in which is the fuel receiving mouth. Once the contact has been made, which consists of inserting this nozzle from the end of the pole of the tanker aircraft's boom into the mouth of the receiving aircraft's receptacle, the fuel is supplied (after being hooked by claws placed in this nozzle to the receiver's receptacle).

The great advantage fuel with a boom, as opposed to the type 1 mentioned in the first paragraph, is, on the one hand, the greater flow that can be achieved in the supply (which could result in a shorter refuelling time) and, on the other hand, the workload for the pilot of the receiving aircraft, which is lower than in the case of a basket and hose, where the responsibility for the operation falls directly on him. In this last method involving a hose and basket, the receiver pilot is responsible for making contact almost exclusively.

Boom operations are less stressful for the pilot of the receiving aircraft, who is limited to being placed in an adequate position relative to the tanker aircraft. In order to carry out the operation referred to above, it is necessary to know, at all times, the positions of both the end of the pole (i.e. the nozzle) and the mouth of the receptacle. At present, this information is visually acquired by the operator in charge of manually carrying out the operation to make contact with the boom.

If we want to automate the operation, this information must be provided to the tanker system that controls the boom, so that it can modify the appropriate "control laws" that control its movement. It can also be supplied for the control of the tanker and even for that of the receiver. All three can thus contribute to a comfortable and safe automatic operation.

As mentioned above, the operation is currently carried out manually. The object of this application is precisely a system for automatically or semi-automatically making contact between the nozzle or fuel supply device of the boom of a first tanker aircraft and the receptacle located on the surface of a second aircraft or receiving aircraft, which will receive fuel from the first.

It is also the objective of the elements involved in the system to provide the first aircraft, i.e. the tanker, with the location of the receiving aircraft and, more specifically, its receptacle, with respect to a coordinate centre in solidarity with said tanker; so that once the second aircraft or receiving aircraft has approached and been placed in a suitable position for contact, it can be taken up by the nozzle of the tanker aircraft's pole and so begins the supply of fuel up to the stipulated quantity and during the stipulated time.

Likewise, another facet of this invention is to provide the system that governs the boom of the tanker aircraft, the position of the nozzle that is at the end of the pole of the same, with respect to the same reference centre of the previous section, and even more importantly, the relative position between the outlet of the nozzle of the tanker's pole and the inlet to the receiving aircraft's receptacle.

As indicated, with this data, the receiving aircraft can be placed in the appropriate contact position and once it has been placed in a stable position, while waiting to receive the fuel, the tanker will be able to know the position to which the end of its boom will have to move in order to place the nozzle in the receptacle of the receiver before the fuel can be begun to be supplied.

In short, on the basis of this information, the operation, as has been said, may become semi-automatic or automatic depending on the design of the control laws that govern the movement of the tanker aircraft's boom and even those of the tanker and receiving aircraft themselves, depending on this information. The objective of this patent is to obtain and provide such information.

BACKGROUND OF THE INVENTION

As indicated in the opening paragraph, in-flight refuelling is currently carried out in two different ways. With hoses and baskets, or with flying booms. In the event that it is done with a boom, the end or nozzle (fuel outlet nozzle) of its pole must fit into a receptacle located on the surface of the aircraft that will receive the fuel. This entire operation is currently carried out manually and depends on the expertise of the tanker operator or "Boomer".

In order to have accurate information on both points (end of the pole and mouth of the receptacle), signalling devices are often used; and through sensors capable of "seeing" these signals, the positions of both can be determined. In the state of the art, the following patents related to the object of this invention are known.

U.S. Pat. No. 6,752,357 describes a distance measurement system for a refuelling aircraft comprising at least one extendible refuelling arm, at least one camera and one computer. The refuelling arm is equipped with a nozzle. The pole nozzle has a geometry suitable for connecting to an aircraft refuelling receptacle. Each takes a plurality of images, both of the pole nozzle and the refuelling receptacle. The computer receives each of the images, converts the images to a plurality of pixels, and analyses them to determine a distance between the pen nozzle and the refuelling receptacle. The end of the refuelling pole is a fixed reference point between the coupling end and the refuelling aircraft. The camera fixing point for the aircraft also forms a camera reference point.

U.S. Pat. No. 5,530,650 describes a visual guidance system and a method, which includes a subsystem that locates both aircraft and aircraft coupling structures, and also determines their movement and rate of change of movement. The location subsystem has an electrical output that feeds a computer with location and motion data using software that combines the data with other data in a database containing the size and dimensional configuration of the aircraft and coupling structures. The combined data is converted into a suitable form and fed to the computer monitor that displays the aircraft structures and aircraft coupling structures in real time during the refuelling operation. The monitor features image controls that allow the operator to select the perspective angle of vision, as well as image contrast and colour in order to enhance the visual signals provided by the image and facilitate refuelling operation.

US2007023575: This patent describes a vision system for use in an air-to-air refuelling tank vehicle that does not require multiple cameras to provide a stereo vision image for a Boom operator to perform a refuelling operation on a receiving vehicle.

US20110147528: This patent describes a three-dimensional vision system of a given scenario, allowing the different parts of the scenario to be viewed in greater detail. It also seeks to provide methods and systems for the vision of tanker aircraft, to track the refuelling operations of receiving aircraft that allow selected parts of the refuelling area to be viewed with a greater degree of detail. The system comprises at least two high-resolution cameras to provide video signals of the scenario for stereo monitoring, at least one three-dimensional monitoring system to display three-dimensional images of the scenario, and also includes means for viewing three-dimensional enlarged images of a selected area of the scenario.

U.S. Pat. No. 7,469,863 is a patent describing an automatic refuelling system and associated methods, which has an input device for an operator, configured to receive inputs, and a first input signal corresponding to a position for an aerial refuelling device. It also has a sensor positioned to detect a location of at least one of the refuelling devices.

It is also important that the system for obtaining the locations of both the end of the pole and the receptacle mouth is a robust system that allows this information to be provided safely and at all times, regardless of the instant, position or lighting or other environmental conditions. This is achieved with the system object of this invention, which by using multiple sensorisation (or an arrangement of sensors and emitters for obtaining information), based on different technologies, obtains reliable and robust results at all times by combining them.

The object of the present invention is therefore to develop a system for the automatic contact of the boom with the receiving aircraft, for in-flight refuelling, as described below.

The fundamental differences of this invention with respect to other inventions include:

The existence of an active device on the pole and another on the receptacle to determine its exact, precise and reliable positions by means of several techniques used in parallel.

That these devices generate an optical signal which is therefore not detectable except with vision cameras operating at the same wavelength and at a very short distance from them.

The existence of different sources to obtain the same information from the position of the receptacle of the receiver and even more sources to obtain information on how the nozzle of the pole is placed (high redundancy).

The use of neural networks in part of the information processing, in addition to conventional algorithms, to obtain results.

DESCRIPTION OF THE INVENTION

As stated above, the system seeks to obtain contact between the end of the pole, or nozzle, and the receptacle mouth, either automatically or semi-automatically, i.e. to provide the tanker aircraft with the position of the receiving aircraft relative to it or, more importantly, the relative position between the outlet of the mouth of the tanker's pole and the inlet of the receiving aircraft's receptacle tube. Once the positions of the nozzle of the pole, the mouth of the receptacle and their pointings have been determined, dynamically, over time, and with respect to common axes, this information can be supplied to the Control Laws of both the receiver and the tanker and its boom, making automatic contact a reality.

The system comprises four fundamental elements or parts:

I. A BD element (which we will call the Boom Device) consisting of a support casing that is attached to the end of the pole. A set or subsystem of light emitters are arranged on its surface. These emitters consist of LEDs in a preferred embodiment, along with on/off electronics.

II. An RD element (which we will call the Receptacle Device) made up of light emitters and an electronic ignition control thereof. The light emitters, which in a preferred embodiment, can be LEDs, are arranged on the contour of the receptacle of the receiving aircraft. From there, they signal the situation of this receiver, and this enables the position of the mouth of the receptacle to be obtained in a very precise and robust way. The RD light emitters on and off switching is controlled by a P processing unit (explained below). Part of this P unit may be located next to these emitters or elsewhere.

III. A C element consisting of a box attached to the outer surface of the aircraft, preferably in the tail cone and housing the following three subsystems:

1. A first subsystem of 3D vision formed, in general, by a left and a right camera that generate a 3D vision of the work scenario (which we will call the 3D subsystem): S3D). This S3D subsystem, together with its electronics, controls the alternative ignition of the BD emitters and allows, via the processing of both images, the spatial position of these BD luminous elements to be obtained. It obtains the luminous elements of RD from a similar one. Also, by means of image processing based on segmentation, recording and the calculation of distances, it obtains the position of the end of the boom and the receptacle of the receiving aircraft by a different procedure.

2. A second subsystem that we will call STOF comprised by a TOF—(Time Of Flight) type camera that has the special feature of measuring the time that it takes a pulse of light generated to be reflected in the various objects in our work scenario, since this pulse leaves our generator from the same point, until it arrives at each pixel of the image sensor used. The STOF subsystem also consists of electronic elements, a laser with its diffuser, a lens and a F1 narrow bandpass filter to eliminate light other than that used to light up our scenario. Here the main function of the electronic elements is to calculate the round trip time of the photons that come out of the L1 laser emitter, which is also part of this subsystem, and that bounce off the objects around the aircraft to go back to each pixel of the camera. These electronic elements will also be responsible for triggering the light pulses of the laser. It is obvious that the wavelength λ1 of the laser light L1 is the same as the central wavelength of the F1 filter band of the TOF camera.

3. A third subsystem, which we will call SDOE, comprised of a camera that has, before reaching its sensor, a very narrow band pass filter that only lets wavelengths (λ2) pass that are very close to those generated by an L2 laser that also belongs to the subsystem. In this document, we will refer to this camera as a DOE-type camera because of its purpose. Its mission is to detect the points of light of a known pattern, created when reflected in our scenario, the light from the L2 laser, by passing through a DOE (Diffractive Optical Element) diffraction lens, engraved with that pattern. The camera of this SDOE subsystem is comprised of its electronic elements, an image sensor, lenses and an F2 narrow bandpass filter. The latter is tuned, as indicated, to a wavelength λ2 which is the central emission of the L2 laser. The electronic elements of the camera are capable of detecting the mentioned pattern of light on the objects of our environment and with this information, by means of triangulation and trigonometry, they are able to determine the distances relative to it from the points that form it.

IV. A processing element that we will call P. This element has two parts: One consists of a combination of processors, both conventional in type, that execute instructions sequentially (such as multi-core processors or fpga-s (Field Programmable Gate Array) and gpu-s (graphics processor units)), and another with other processors based on neural networks with training capacity and processing in parallel. In addition, element P consists of a subsystem that communicates with the rest of the subsystems that make up the invention. The functions of element P are, on the one hand, to obtain the position of the receiver and, on the other hand, the location of the boom from the information provided by the S3D, STOF and SDOE subsystems. Among other results, P obtains a point cloud from the receptacle, and parts attached to it, of the receiving aircraft. When this point cloud is known and comparing it with information, stored in a database, relating to the 3D models of the possible aircraft with which to establish contact, a 3D model of the receiver can be placed in a virtual space, and from this the exact position of the receiver's receptacle can be obtained. The point cloud is also passed through a previously trained neural network to finally obtain the position of the receptacle again (redundantly). The same will be done with the data of the point clouds and the 3D model of the boom. Another function performed by P is to determine the positions of the emitters of the BD elements of the pole nozzle in order to obtain the position of the pole end and the RD of the receptacle. P calculates all the significant points and vectors already indicated. It also performs dimensional adjustment and removes aberrations from the lenses or the sensor itself. It will be essential to perform a calibration beforehand to ensure the correct operation of the whole system. The components of P may be concentrated in a single location or scattered into parts along with the other subsystems of this invention.

In the first instance, only 3D cameras perform the necessary functionalities. The system would be reduced to two cameras and the BD light emitting device placed at the tip of the pole. All with their corresponding accessories, to which the processing element P should finally be added.

In a second, more complete embodiment, the RD system is part of the system.

Other embodiments include different combinations of the rest of the subsystems that are included in C.

The whole system, in any of its embodiments, will be fed by a power supply of the aircraft and will output a set of coordinates $(X_i, Y_i, Z_i)$ of the key points as well as of the orthogonal versors $(V_{ix}, V_{iy}, V_{iz})$ located in each frame of images. In addition, all electronic systems, which can be considered as part of P, have a communications subsystem for exchanging information with the other subsystems.

The S3D, STOF and SDOE subsystems all generate point clouds from the calculated distances and have electronics with embedded algorithms capable of pre-processing the information received from their cameras and sending it to the rest of the processing element P that obtains from these points the location of the receptacle of the receiving aircraft and the location of the tip of the boom from their 3D models once fitted into these point clouds obtained.

Unless otherwise indicated, all the technical and scientific elements used in this report have the meaning usually understood by the normal expert in the technique to which this invention belongs. In the practice of this invention, procedures and materials similar or equivalent to those described in the report can be used.

The use of different combinations of the basic system, with the S3D, and the subsystems STOF and SDOE constitute, in essence, the different claims present in this patent.

In the description and claims, the word "comprises" and its variants do not aim to exclude other technical characteristics, additives, components or steps. For the persons skilled in the art, other objects, advantages and characteristics of the invention will be partly inferred from the description and partly from the practice of the invention.

EXPLICATION OF THE FIGURES

In order to complement the description being made and with the object of helping to better understand the characteristics of the invention, in accordance with a preferred practical embodiment thereof, said description is accompanied, as an integral part thereof, by a set of drawings where, in an illustrative and non-limiting manner, the following has been represented:

In FIG. 1-A, BD is a simplified representation of the device—(13) which is placed at the end of the extendible part of the pole (3) of the boom (6), in the nearest possible area, to the fuel outlet nozzle (4). P represents the processing element (21) that is usually inside an aircraft. Also shown is the casing (14) which houses, in case of the chosen embodiment, the S3D (9), STOF (12) and SDOE (10) subsystems, each with its corresponding optional auxiliary components. In FIG. 1-A, this casing only houses the S3D subsystem, whereas the three subsystems have been schematically represented in the FIG. 2-A below.

FIG. 1-B shows the RD device on whose contour (23) there is a set of light emitters (25) and a light sensor (26) in the upper part. This element will be placed on the receptacle (28) of the receiving aircraft (27).

FIG. 2-A shows a simplified representation of all the elements that form part of the invention, in its most complete embodiment, and how they can be placed (2) under the tail cone (11) of the tanker aircraft where the angle of vision (7) is the minimum necessary to carry out the operations. In this, the boom (6) hangs from the tanker aircraft (1) from its tail cone (11) held by a joint (8) and has flaps (5) that control its movement. The pole (3) on the end of which the BD element (13) has been placed, just before the fuel dispensing nozzle (4), comes out of the inside of the flying boom. This nozzle must fit into the mouth (24 of FIG. 1-B) of the receptacle (28) of the receiving aircraft (27).

FIG. 2-B shows a receiving aircraft (27) with a receptacle (28).

DETAILED DESCRIPTION OF THE INVENTION

The system object of this invention consists of the following four elements. For purposes of efficiency or comfort, some of its components may be located elsewhere on the aircraft, and below we will indicate the preferred embodiment and location in general.

I. A first element (BD in FIG. 1-A) which we will call BD which is installed in the area where the tip of the boom's (6) pole (3) can be found, as a ring that grabs it and consists of a casing that protects an electronic elements set and that supports a set of light emitters (16), that in general can consist of LEDs or laser diodes with their respective diffusers. These emitters are arranged on their surface and emit light homogeneously, at certain times, which will be detected by a set of cameras of the subsystem S3D (9), whose task will be to determine the position of these light emitters in relation to them. The electronic elements (22) consist of an adaptation of the aircraft's power supply, a set of drivers or adapters for switching on the light emitters and a communications subsystem that will receive commands from the electronics that govern the previous cameras in order to obtain a certain level of synchronisation between both subsystems (cameras and LED emitters).

II. A second element (FIG. 1-B) that we will call RD that is installed in the contour (23) of the receptacle of the receiving aircraft (27) (FIG. 2-B), and that consists of a horseshoe-shaped support on which light emitters (25) and a light sensor (26) are placed, as well as a small electronic element that supports the former. The light emitters can consist of LEDs or laser diodes with their respective diffusers. These emitters are arranged on their surface and emit light homogeneously, at certain times, which will be detected by a set of cameras of the subsystem S3D (9), whose task will be to determine the position of these light emitters in relation to them. The electronic element consists of an adaptation of the aircraft's power supply, a set of drivers or adapters for switching on the light emitters and a communications subsystem that will receive information from the tanker itself through the light sensor (26) or from inside the receiving aircraft (27) (FIG. 2-B), and in turn can also send information received by sensor to the interior of the receiving aircraft. This device therefore has two main functionalities: Firstly, it is located by the cameras of the S3D subsystem (9) (which will be detailed below) of the tanker, and secondly it is able to maintain communications between the tanker and the receiver thanks to its emitters (25) and its light sensor (26).

III. A third element (further detailed in FIG. 2-A), which we will call C, formed by a second box or casing (14) that houses the rest of the subsystems of this invention, including part of the final processing element P (FIG. 2-A) and of the interface with the aircraft system where the Control Laws are found. In a preferred embodiment, this element C is placed under the tail cone (11) of the tanker aircraft (1), without prejudice to the fact that the same subsystems that integrate it may be dispersed and placed in different zones of the tanker in different embodiments of the same patent.

Within element C we have up to three different subsystems, depending on the specific embodiment of this patent:

1. Firstly, a first subsystem called S3D (9) which contains the 3D cameras (17) and is responsible for locating the LEDs of the BD element described in point I (FIG. 1-A) and determining the position of these emitters in front of them. In addition, this subsystem is responsible for determining the inlet mouth of the receiver's receptacle from the light emitters (25) on the receiver corresponding to the element RD. It is also responsible for determining the position of the receptacle from the images obtained of the receiving aircraft on whose surface it is located. These cameras have their respective image sensors, processing electronics, focusing lenses (18) and a narrow B3 bandpass filter centred in a A3 place of the spectrum and controllable in terms of adding and removing. Some of the cameras may have variable electronic control lenses (19). This wavelength is compatible with the other cameras involved in the refuelling operation and is centred on the same emission wavelength as the LEDs of the BD element. This will help to eliminate photons coming from other sources, such as the sun itself. The additional electronics also have the mission of controlling the switching on of the BD LEDs over time, generating certain patterns that also help to distinguish them from the light emitted by other sources. The processing consists, in essence, of an embodiment with a crossed correlation between the pattern of light generated and the light received in each image frame. Finally, this electronic element, after detecting each LED emitter of the BD element, which is visible from the cameras, calculates the distance and the rest of the coordinates of each LED with respect to a set of reference axes, which for simplicity are placed in the centre of the sensor of one of the cameras and which we call CR.

Something similar will be done for the RD emitters, but in this device, the switching on of its LEDs is not synchronised or controlled by P.

The S3D subsystem will be powered by an aircraft power supply and will output a set of coordinates (X, Y, Z) of the active points it locates in each frame. The processing electronics shall cover functionalities such as the detection of the coordinates (x, y) of each active point located by each camera independently, as well as the calculation of the global coordinates with respect to the reference axes with centre CR from the (x, y) of both cameras. It will also perform dimensional adjustment and remove aberrations from the lenses or the sensor itself. It will be essential to perform a calibration beforehand to ensure correct operation.

The distance calculation is carried out at each time interval of the frame, using the images obtained by both cameras at the frequency of obtaining images from them. Besides identifying a set of points in both, we can obtain through triangulation the distance of each point to them and thus obtain a point cloud for our receiving aircraft and our boom whenever there is no geometric interference and they are seen by two cameras.

The 3D cameras are each equipped with some (or all) of the following auxiliary elements:
  Controllable zoom lenses (19), focusing lenses (18) and filtering lenses.
  Electronic elimination of aberrations, dead pixels, image improvement and calculation of coordinates (x, y) of the LEDs of the BD element and the receptacle.

In addition, in a more complete embodiment of this same patent, C may house some of the following subsystems:

2. A second subsystem comprised by a TOF-type camera that has the special feature of measuring the time that it takes a pulse of light generated to be reflected in the various objects in our work scenario, since this pulse leaves our generator from the same point, until it arrives at each pixel of the image sensor used. This subsystem, which we will call STOF, has an electronic element, a focusing lens and a narrow B1 bandpass filter to eliminate the different light used to light up our scenario. Here, the electronic element has a functionality which calculates the round trip time of the photons that come out of an L1 laser emitter and bounce off the objects around the aircraft to go back to the camera. These electronic elements will also be responsible for triggering the light pulses of L1. These calculations are performed for each pixel or point of the TOF camera sensor. It is obvious that the wavelength $\lambda 1$ of the light of L1 is the same as the central wavelength of the B1 filter band of the chamber of the STOF subsystem (12). The laser will be accompanied with a lens to expand the light generated to illuminate the entire work scenario, although in a particular embodiment that lens may be a diffraction lens that only emits light to certain points of our work scenario. The result is a cloud with the same amount of points as pixels possessed by the TOF sensor, which gives the distances from the light emitter to the specific point of the scenario, which is focused on the corresponding pixel.

3. A third subsystem that we will call SDOE (10) comprised of a camera equipped with electronic elements, and an optical system that includes a narrow band pass filter (20) at a wavelength that coincides with the emission of a laser. The laser is also equipped with a lens including a DOE (Diffractive Optical Element). As the laser emission passes through the DOE lens, the light is diffracted, creating a specific pattern that has previously been engraved on the DOE lens. The mission of this SDOE subsystem to firstly detect with the camera, which we will call a DOE-type camera, the points of light reflected on our scenario and generated as a result of the structured lighting that is generated. The L2 laser of wavelength $\lambda 2$, turns on and off at controlled periods to facilitate the detection of the points illuminated by the pattern generated. The DOE camera is comprised of its electronic elements, an image sensor, lenses and narrow B2 bandpass filter tuned to $\lambda 2$. Once the points have been detected, the electronic elements determine the relative distances of the points illuminated and received in the pixels of the camera as the second part of the mission of this subsystem. This is done by means of triangulation, measuring the displacement generated according to the distance and with knowledge of the separation between the laser and the camera used. As already mentioned, the wavelength $\lambda 2$ of the L2 light is the same as the central wavelength of the B2 filter band of the SDOE subsystem camera. The result is therefore a new point cloud corresponding to those detected in the sensor when reflected from our structured illuminator.

The subsystems described in 2 and 3 are comprised of the TOF and DOE cameras and the L1 and L2 laser emitters. As well as other auxiliary components and all the electronic elements that control them.

IV. A fourth element that we will call processing element P (21), which will be located in a box inside the tanker aircraft (1), (and part of which can be considered distributed among the electronics of the other components of this invention), whose mission is, from the information provided by subsystems 1, 2 and 3, to generate the following information (all referring to certain common coordinate axes):

Vector position of point P1 of the end of the pole=OP1;
Versor orthogonal to the surface that closes the nozzle of the pole=VO1;
Vector position of point P2 placed at the end of the receptacle mouth=OP2;
Versor orthogonal to the surface that closes the mouth of the receptacle=VO2;
Vector relative speed between P1 and P2=VR;
Vector relative acceleration between P1 and P2=AR;

As well as any others that could be of interest and can be obtained from the information generated by these subsystems.

One of the main functions of element P is to obtain the point clouds generated by subsystems 1, 2 and 3 above in order to determine from them the coordinate and vector values specified above. The information processing that P can perform is based on the use of two different groups of processors, and therefore calculation paradigms, which are indicated below. On the one hand, there are the traditional processors, understood as such those which are more conventional, based on a micro-programmed logic with a set of instructions, which are executed sequentially, or based on high-speed hardware such as fpga-s or gpu-s. On the other hand, there are those based on neural networks. In addition, element P consists of a subsystem that communicates with the rest of the subsystems that make up the invention. Therefore, P is in charge of obtaining the significant data from the receptacle of the receiving aircraft and the tip of the boom, from the point clouds obtained by the cameras of the different subsystems that are integrated in C.

The processing element P also has a memory where it houses a database of 3D models of the different aircraft with which it is intended to refuel as well as 3D geometric information of the boom. In the case of traditional processors, P adjusts the 3D models with the values of the obtained point clouds and thus places the 3D models in a virtual space and determines the positions of the indicated values and points of interest. In the case of the neural network, the desired values are obtained after training with different situations of real refuelling.

The data generated above allow the system that governs the laws of control of the tanker as well as its boom to have the appropriate information to establish the correct strategy that generates the approach and subsequent desired contact between the nozzle of the pole and the mouth of the receptacle. The two processing options can be used in combination or in isolation to deal with the information generated by the different data collection subsystems.

The operating procedure of the automatic contact system covered by the invention comprises the following stages:

Determination of the position of each light emitting point of the BD and RD elements, which are located in solidarity, respectively at the end of the pole nozzle and at the contour of the receptacle, using 3D cameras. The light emission by these emitters is uniform in the emission directions and allows 3D cameras to "see them" and thus determine the position of each of them with respect to CR. In order to facilitate this task, the emitters are alternatively flashed with certain patterns. The first are synchronised with 3D cameras, and the second are not. All are filtered temporarily with respect to the other LEDs. This avoids unnecessary overlaps between the emitters and facilitates detection by cross-correlation techniques to eliminate confusion with other points of light. Reflections can also be eliminated thanks to the synchronised alternative lighting of the emitters. This synchronism minimises the energy needed for detection. The use of a filter tuned to the light emitting wavelength of the emitters also allows an increase in the signal-to-noise ratio, again facilitating this detection. Once at least three emitters have been detected, the position of the point of the pole tip is obtained by means of a simple algebraic calculation based on a triangulation. This is possible because we know the distance between the cameras, their direction and focal length. We can thus calculate the spatial coordinates of these emitters with respect to a Reference Centre (RC). In addition, from the coordinates of three suitable points, we obtain the exact position of the location of the centre of the nozzle. This is done with subcentimetre precision. In addition, we obtain the vector perpendicular to the surface that closes the "nozzle" (4). This provides a first source of information that corresponds to the end of the boom with respect to RC included in element C. Similarly, we take action on the light emitters of the RD element.

The light emitters can be of different colours, alternating one "colour" or another or emitting both according to whether it is seen by one camera or another, or both.

Obtaining a first point cloud, by identifying specific points in both cameras. From the image of the end of the boom and the image of the receiving aircraft placed below it, image processing is performed consisting of a segmentation and a register to identify the same points in both frame images coming from both cameras at every instant. From their positions in at least two cameras, and through a triangulation method similar to the one used to detect light emitters in the previous section, the coordinates of all the points identified in all the S3D cameras are obtained. This set of coordinates is neither more nor less than the point cloud with respect to the RC that is sought to be achieved. Note that two sub-clouds of united points are obtained: One corresponding to the end of the boom and another corresponding to the receiving aircraft.

Obtaining a second point cloud, which corresponds again, with the end of the boom and the receiving aircraft from the STOF subsystem, L1 together with the other auxiliary components. The L1 laser provides a set of light pulses with wavelength λ1. The circuit that triggers the switching on of this laser is the same that governs the shooting and image acquisition of the TOF-type camera included in STOF. Considering the speed of light and the time it takes to receive the pulse generated in each pixel of the sensor of the TOF-type camera, the distance from the point of the scenario that reflects the light received can be obtained. To facilitate this task, a narrow band pass filter B1 centred in λ1 is placed in front of the TOF-type camera. In addition, the phase shift technique is used to accurately determine the moment at which the pulse emitted by L1 reaches the sensor again. This is done for each point of our scenario that is received at each pixel of our sensor in the TOF camera. This results in a new cloud with the same amount of points as the resolution of the sensor used. The TOF camera provides a new point cloud for each frame time.

Obtaining a third point cloud that corresponds again with the end of the boom and the receiving aircraft from the information it provides us in a very similar way to the previous one, the SDOE subsystem formed by the DOE-type camera plus the L2 laser and other auxiliary components. The L2 laser generates a pattern (this pattern can be fixed or variable depending on whether the other laser lenses are controlled) of structured light thanks to the diffraction lens, through which we pass it once properly collimated. The elements of this pattern can be identified if we are able to "see" the light emitted by the laser when reflected by our environment. To facilitate this, we use a new narrow B2 band pass filter in front of the SDOE camera, tuned to L2 and that will eliminate light from other wavelengths. In addition, turning it on and off with a certain rate will also help us to distinguish the light of the laser with respect to other light from different sources, which will not blink in the same way. With cross-correlation techniques we will obtain the pixels that are reflected in the objects of our scenario, and from their relative intensities we will determine which pixels correspond to certain points of the pattern. As a result, we obtain a set of points that, again, by means of triangulation and trigonometry techniques, taking into account that we know the distance from the L2 laser to the SDOE camera and the angles of both, will allow us to obtain the distances from the SDOE camera to each point of that set of points. In short, we will have a set of coordinates ($x_i$, $y_i$, $z_i$) belonging to the objects of our scenario, for each picture frame. So again we have a point cloud similar to the one obtained by the STOF camera but in a different way.

The next step is, alternatively, to either merge the information from the point clouds, for each table, to obtain the best starting point cloud, or to apply one of the processing methods (which will be explained later) from among those that P can perform, to each of the point clouds; to merge the results obtained and achieve the best and most robust solution of the position of the points and vectors of interest. As mentioned above, all of this is for each picture frame over time. The calculation of relative velocities and accelerations, as well as the indicated orthogonal versors, is a purely algebraic matter requiring few processing resources. The processes that we can carry out in P to the point clouds obtained by the different elements that integrate this invention consist of:

Making them pass through an artificial neural network trained to provide as outputs the coordinates of the location and orthogonal vector of the two points of interest with respect to our reference centre RC.

Comparing them with one of the stored 3D models of our receiver and the boom to find the position of both the refuelling mouth of the receiver and the centre of the end of the nozzle (4) of the pole, once both are separated. These points with respect to our reference centre RC. The great certainty provided by the BD and RD elements when it comes to obtaining the positions of both the tip of the boom and the mouth of the receptacle, allows us to carry out a first segmentation of our images in order to obtain clouds of independent points, corresponding to the tip of the boom and the mouth of the receiver, and thus remain with sub-clouds corresponding to the different objects in our images.

The stages through which the element P passes, in the case of a comparison of point clouds with one of the stored 3D models, are as follows for the case of conventional processors:
1. Comparison of the point clouds received through any of the previous procedures, with the 3D representation of the aircraft model to which fuel is to be supplied and the boom to find coincidences between point clouds and 3D models, and thus determine the exact spatial position with respect to the RC centre of coordinates.
2. Once the spatial position is known, the virtual model of the aircraft is placed in its theoretical space position. In this way, you can see the surface of our 3D model on the real image.
3. Once the 3D model has been virtually placed in our work scenario, we can know the location of the mouth of the receptacle and other significant data. This allows us to place these points of interest in their spatial location with respect to the RC coordinate centre. In the test phase, this allows us to see the difference between the actual position of the receptacle and the position predicted by the 3D model, and it is of special interest because it obviously shows any errors that may exist in this phase.

On the other hand, the stages through which the element P passes in the case of processing the point clouds by passing them through an Artificial Neural Network are as following:
1. Training of the neural network by entering point clouds and checking the outputs to determine and return the error information to the network in order to train it. (This phase is called training.)
2. Once trained, already in the recognition phase, new point clouds can be provided, which will respond with the values that the Network considers most likely of the points of interest trained.
3. Supervision of the data emitted by the Neuronal Network to avoid inconsistencies.

For both types of processing, there is one last task to be performed that consists of:
4. Fusing the information obtained by alternative methods to obtain the information of interest in a robust and reliable way, and thus be able to feed the control laws of the boom and carry out the automatic refuelling operation. To perform this task, each subsystem is assigned the calculation of certain values that are known as quality factors and essentially tell us how reliable the results they have provided are or what their probability of error is. This information is used to ensure the optimal fusion of the results obtained.

The point clouds obtained by the subsystems S3D, SDOE and STOF are used in a hybrid calculation with the two indicated procedures, i.e., it will use neural networks jointly and the comparison with a 3D model, to obtain the positions and vectors of interest.

Therefore, thanks to the system and procedure of this invention, a mechanism is provided for obtaining a set of data depending on time, with a negligible latency and an adequate rhythm, to allow the system that governs the laws of control of the tanker and its boom as well as the receiving aircraft, to incorporate these data in its control and thus govern both the tanker, the boom and the receiver to give rise to a contact between the latter two in a semi-automatic or even automatic way, whether supervised or not.

Having sufficiently described the nature of the present invention, in addition to the manner in which to put it into practice, it is hereby stated that, within its essentiality, it may be put into practice in other embodiments that differ in detail from that indicated by way of example, and to which the requested protection applies, provided that its main principle is not altered, changed or modified.

The invention claimed is:

1. A flying boom tip and receptacle mouth detection system for an in-flight flying-boom refueling system comprising:
A BD element including a support casing attached to the end of a pole of a boom, with a set of light emitting cements disposed on a surface of the BD cement with the light emitting elements being LEDs or laser emitters, and associated electronic cements to turn the light emitting elements on and off and control the light emitting elements;
An RD element including a support installed in a contour of a receptacle of a receiving aircraft, a set of light emitters disposed on the contour of the receptacle with the light emitters being LEDs or laser emitters and associated electronic elements to turn the light emitters on and off and control the light emitters;
A C element consisting of a casing attached to an outer surface of a tanker aircraft in a tail cone, with an electronic element for controlling the light emitting element and a pair of 3D vision cameras for detecting the light emitting element from the end of the pole, the light emitters from the receptacle of the receiving aircraft to obtain the coordinates of the center of each light emitting element and other points of interest with respect to a common center of coordinates, both cameras being provided with a narrow band-pass filter tuned to a wavelength of the light emitters and;
a processing element P for information processing and calculation.

2. The system for detecting the tip of the flying boom and the mouth of the receptacle according to claim 1, wherein the 3D cameras each include:
Controllable zoom lenses, focusing lenses and filtering lenses; or
Electronic elimination of aberrations, dead pixels, image improvement and calculation of coordinates (x, y) of the LEDs of the BD subsystem and the receptacle.

3. The system for detecting the tip of the flying boom and the mouth of the receptacle according to claim 1, wherein the information processing and calculation subsystem P is disposed in communication with the BD element the RD element and the C element and including: traditional processors, based on a microprogrammed logic with a set of instructions being executed sequentially, a high-speed hardware of fpga-s or gpu-s, or artificial neural networks with parallel processing capacity.

4. The system for detecting the tip of the flying boom and the mouth of the receptacle according to claim 1 wherein the processing subsystem P has a memory for housing a database of 3D models of different receiving aircraft for refueling and 3D geometric information of the pole for comparison with information obtained by the processing subsystem P obtained from the cameras.

5. The system for detecting the tip of the flying boom and the mouth of the receptacle according claim 1, wherein the processing element P compares images obtained by synchronous frames of both 3D cameras and identifies a set of points in both.

6. The system for detecting the tip of the flying boom and the mouth of the receptacle, according to claim 1, wherein the contact operation of refueling with the boom includes:
A DOE-type camera having an electronic element an image sensor, focusing lenses and narrow B2 bandpass for detecting photons that reach the image sensor when reflected by the different objects; and An L2 laser equipped with a DOE diffraction lens whereby a predetermined pattern has been engraved and projected onto the environment through the DOE diffraction lens wherein the DOE-type camera is one of the 3D cameras.

7. The system for detecting the tip of the flying boom and the mouth of the receptacle, according to claim 1 including:

A TOE-type camera having an electronic element, a lens and a narrow B1 bandpass filter to eliminate light other than the light being used to light up a refueling scenario; and An L1 laser synchronized with the light taken by the TOF-type camera and having auxiliary elements of a collimator and a lens to expand the light generated.

8. The system for detecting the tip of the flying boom and the mouth of the receptacle, according to claim 1 wherein the RD element has a light sensor that allows the RD element to receive the emissions from the tanker to establish a bidirectional communication channel between the two.

9. The system for detecting the tip of the flying boom and the mouth of the receptacle, according to claim 1 wherein the cameras have variable electronic control lenses.

10. An automatic contact process for air refueling with the flying boom, according to the system of claim 1, the process comprising the steps of:

Determining the position of each point of light coming from the light emitting elements, located solidly with the end of the pole of the boom using the 3D cameras, Determining the position of each point of light coming from the light emitters located in solidarity with the receptacle of the receiving aircraft using the 3D cameras, Obtaining at least one point cloud corresponding to the boom and the tip and the receiving aircraft from at least one of the following sets of elements:

a) a SDOE subsystem including a DOE-type camera, a laser, and auxiliary elements, wherein the laser generates a pattern of light through a structured diffraction lens whereby elements of the pattern includes a narrow band pass filter tuned to the wavelength of the laser to remove light from other wavelengths and turning the laser on and off with at a predetermined rate to facilitate with differentiating the light of the laser with respect to that of other different sources, cross correlating and digital filtering to obtain pixels to determine a set of 2D points whereby triangulation and trigonometry techniques are used to consider the distance from the laser to the DOE-type camera to obtain distances from the DOE-type camera to the set of points and computing the distances, the result, per image frame, to produce a set of 3D coordinates $\{(x_i, y_i, z_i)\}$, corresponding to points that have reflected the photons coming from the laser, b) a STOF subsystem including a TOF-type camera, a laser and auxiliary elements wherein the laser provides a set of light pulses with a predetermined wavelength, a circuit that triggers the switching on of the laser being the same that governs the shooting and image acquisition of the TOF-type camera, a narrow band pass filter centered on the wavelength of the laser being placed in front of the TOF-type camera, the speed of light, the time the light takes to receive the pulse generated in the TOE type camera sensor, and the distance from the points on the scenario that reflect the light emitted can be obtained wherein in each frame time, the TOF-type camera provides a cloud of $N=\{(x_i, y_i, z_i)\}$ points that correspond to the distances of those in a scenario that have reflected the light generated by the laser, or c) a S3D subsystem including the two 3D cameras with identification techniques for significant points in both images to identify a point cloud and to start from both positions of each of the 3D cameras for each point using triangulation and trigonometry techniques to obtain the distances from them to a RC reference system Using the electronic processing system P to perform one of the following:

a) introducing the set of points as inputs to a previously trained artificial neural network in order to obtain the outputs corresponding to the three coordinates of the center of the mouth of the receptacle, the three coordinates of a vector being orthogonal to the surface that closes the mouth, the three coordinates of the nozzle of the pole and the three coordinates of the orthogonal vector at the closure of the nozzle; or b) comparing of the set of points with a 3D image of the surface of the boom and of the receiving aircraft, stored in corresponding database, until the set of points fit or match whereby the real points of the receiver of the cloud obtained correspond to the stored 3D models of the aircraft and the boom to obtain the precise location of the mouth of the receptacle and the nozzle of the pole, and the vectors orthogonal to the closures of the same and place them with respect to the same center of RC coordinates;

Obtaining points of interest from the position of the light emitting element placed in the BD element and the light emitters placed in the RD element, Performing a data fusion with all the results obtained to obtain the best position of both points of interest and the perpendicular vectors of the surfaces that close both ducts for each frame time and computing the relative speeds and accelerations of the points of interest found.

11. The contact process for aerial refueling with the flying boom, according to claim 10; wherein the point clouds obtained by the S3D, the SDOE and the STOP subsystems are used in a hybrid calculation with the two functions performed by the electronic processing system P by jointly using neural networks and the comparison with a 3D model to obtain the positions and vectors of interest.

12. The contact process for aerial refueling with the flying boom according to claim 10 including LED or laser light emitters and wherein the light emission by the emitters is uniform in all directions and allows 3D cameras to see and thus determine the position of each of these emitters with respect to RC; and the light emitters flash with certain patterns in an alternate manner, and being synchronized with the 3D cameras, and temporarily filtered with respect to the other light emitters; and the light emitters having different colors, alternating one color or another, or emitting both based on whether the light emitter is being detected by one camera or another, or both.

* * * * *